United States Patent [19]

Merrill

[11] 3,887,514
[45] June 3, 1975

[54] BODIED ORGANOPOLYSILOXANES AND PROCESS THEREFOR
[75] Inventor: Duane F. Merrill, Ballston Spa, N.Y.
[73] Assignee: General Electric Company, Waterford, N.Y.
[22] Filed: Jan. 2, 1974
[21] Appl. No.: 429,525

[52] U.S. Cl. ...... 260/33.6 SB; 260/34.2; 260/37 SB
[51] Int. Cl. ............................................. C08g 51/28
[58] Field of Search...... 260/37 SB, 33.6 SB, 46.5 R

[56] References Cited
UNITED STATES PATENTS
3,375,223  3/1968  Merrill .......................... 260/46.5 R Primary Examiner—Lewis T. Jacobs
Attorney, Agent, or Firm—Donald J. Voss, Esq.; George B. Finnegan, Jr.; Rocco S. Barrese

[57] ABSTRACT

Silanol-containing organopolysiloxane resins are bodied by effecting controlled condensation at 200°–250°C. in admixture with diatomaceous earth. The bodied resins have improved heat life and superior electrical properties after curing.

16 Claims, No Drawings

BODIED ORGANOPOLYSILOXANES AND PROCESS THEREFOR

This invention relates to a method for building up the molecular weight of organopolysiloxane resins. More particularly, it concerns bodying such resins, substantially free of acid, in admixture with diatomaceous earth at temperatures above 200°C.

BACKGROUND OF THE INVENTION

Several methods have been available in the prior art for building up the viscosities of silanol-containing organopolysiloxane resins in a controlled manner. This process, known as "bodying," is designed to increase the molecular weight of organopolysiloxane hydrolyzates to make them more valuable in resin applications. During bodying, condensation of silanol radicals is effected in the hydrolyzate to lengthen the shelf life and decrease the cure time. If bodying is not carried out in a well-controlled fashion, however, premature gellation of the organopolysiloxane resin will occur, and cause total loss of the batch.

Britton et al., U.S. Pat. No. 2,460,805, teach that organopolysiloxane polymers can be bodied with acid activated clays, such as bentonite and other hydrous aluminum silicates. Activation of the clay is accomplished by heat treatment with strong acids, namely sulfuric acid and phosphoric acid. On the other hand, R. N. Meals and F. N. Lewis, "Silicones", Reinhold Publishing Co., (1959), page 134, disclose that bodying can be carried out with metal soap catalysts, such as zinc octoate.

Both methods have disadvantages in practice, however. Acid activated clays appear to function best only if the bodying temperature is raised to the order of 200°C. at which temperature process control becomes difficult — the more useful solvents boil well below this, too; and, with either acid clay bodying or metal soap catalyzed bodying, the shelf life at 25°C. is often less than three months. Moreover, in all cases the cure time of the resin is longer than would be desirable, often exceeding 20 hours or more, when the resin is combined with conventional curing catalysts, e.g., amines.

A much improved method for bodying such resins is disclosed in Merrill, U.S. Pat. No. 3,375,223, assigned to the assignee of the present application, and incorporated herein by reference. In that method, the silanol-containing resin is heated in the presence of a hydrogen chloride activated particulated siliceous material, e.g., diatomaceous earth, and the bodying is carried out efficiently at temperatures substantially lower than that required with acid activated clays. Moreover, because no metal soap catalyst is used at all, the bodied resin is not contaminated with metal ions which, in high amounts, can impair the stability of the cured resin, as well as substantially reduce its shelf life.

The method of bodying resins described in the Merrill patent, while efficient, does provide resins which still have some disadvantages, in common with all of the other silicone resins bodied by prior art procedures. Chief among these is the need to add greater than 0.005% of catalytic metal on resin solids to obtain a fast enough cure. However, all such resins catalyzed with the optimum amount, e.g., 0.03 to 0.06% as iron, degrade in less than 1 week at 250°–300°C.

It has now been discovered that when silanol-containing organopolysiloxane resins, substantially free of acid byproducts, are bodied in admixture with diatomaceous earth (preferably unactivated diatomaceous earth, that is not acid activated) and at a relatively high temperature, of about 200°C. to 250°C. and preferably in the substantial absence of an organic solvent, then bodied resins will be obtained with superior properties, especially superior electrical properties. Moreover, when the resins are bodied according to this discovery, they may be cured without metal catalysts, which tend to reduce electrical properties. The resins prepared according to this invention have a novel chemical structure, the chemical nature of which is not fully known at this time. In any event, they exhibit outstanding heat stability. Furthermore, the cure rate with or without metal catalysts is excellent. They are also high purity materials which can be used for the protection of electronic components, e.g., semiconductor junctions. They exhibit unusually good strengths and are widely compatible with other polymers, to a greater extent than many of the silanol-containing organopolysiloxanes of the prior art.

DESCRIPTION OF THE INVENTION

According to this invention, there is provided a process for effecting the controlled condensation of silanol radicals in a silanol-containing organopolysiloxane, which comprises:

1. heating at a temperature of between 200°C. and 250°C., a mixture comprising the silanol-containing organopolysiloxane, substantially free of any excess acidity, and diatomaceous earth in an amount of from 0.75 to 20% by weight of the silanol-containing organopolysiloxane; and 2. recovering in organopolysiloxane from the resulting mixture of (1), having a viscosity higher than the silanol-containing organopolysiloxane.

The silanol-containing organopolysiloxane will illustratively be a hydrolyzate of the formula:

$$(R)_a SiO_{(4-a)/2}$$

wherein R is selected from a monovalent hydrocarbon radical and a halogenated monovalent hydrocarbon radical and a has a value of from 1 to 1.8, preferably from 1.25 to 1.75, inclusive.

Radicals included by R are, typically, alkyl and chloroalkyl radicals, such as methyl, chloroethyl, propyl, octyl, and the like, aryl and haloaryl radicals, such as phenyl, chlorophenyl, bromophenyl, dichlorophenyl, diphenyl, naphthyl, tolyl, xylyl, and the like. R can be more than one radical, e.g., two or more of the foregoing. Preferably the organopolysiloxane will be a methylphenylpolysiloxane.

The silanol-containing material which is bodied according to this invention can be made, for example by hydrolyzing an organohalosilane of the formula:

$$(R)_b SiX_{4-b}$$

wherein R is as defined above, b is an integer equal to 1 or 2, and X is a halogen, e.g., chloro, bromo, etc. Specific examples useful organohalosilanes are methyltrichlorosilane, dimethyldichlorosilane, methylphenyldichlorosilane, phenyltrichlorosilane, diphenyldichlorosilane, and the like.

Preferably, mixtures of the above-mentioned organohalosilanes will be employed to produce resins bodied in this invention. Hydrolysis of the mixture of halosilanes of the above formula can be carried out by well known methods. One description is found in Rochow, "Chemistry of the Silicones" (2nd Edition), John Wiley & Sons, Inc., New York, pages 90–94. Such procedures involve the addition of water to the organohalosilanes or mixtures thereof with aliphatic alcohol. One particularly useful procedure involves hydrolysis in a two phase system using a water immiscible organic solvent and acetone in the media. This is described in the copending application of D. F. Merrill, Ser. No. 115,715, filed on Feb. 16, 1971, assigned to the assignee of the present application, and incorporated herein by reference. The preparation of such preferred starting materials will be described in detail in the examples hereinafter. Preferably, the methylphenylpolysiloxanes will be composed of chemically combined methylsiloxy units and diphenylsiloxy units.

The diatomaceous earth is a form of particulated siliceous material containing silicon dioxide or its hydrates. Unlike clays, it is substantially free of chemically combined aluminum. The diatomaceous earth is a heterogeneous solid material having a high surface area, of at least 0.2 m.$^2$/g. Diatomaceous earth is also known as infusorial earth and/or siliceous earth, fossil flour and kieselguhr. It is composed of siliceous fragments of various species of diatoms, and is a light gray to pale buff powder which is insoluble in water, acids and dilute alkali. It is commercially available from a number of sources, e.g., under the tradenames Celite and Super-Cell. A typically useful form is known as Celite 545, and is available from Johns-Manville Corporation.

It is important to use diatomaceous earth which has not been pretreated or activated, especially with acid, and particularly with hydrochloric acid, in the present process.

In practicing the invention, a mixture of the silanol-containing organopolysiloxane, free of any excess acidity, and the diatomaceous earth is heated. The bodied organopolysiloxane is separated at a higher viscosity.

The order of addition of the various ingredients to the bodying mixture, which can also include a minor portion, preferably less than 10% by weight of a suitable organic solvent and the like, is not critical. Preferably, the diatomaceous earth is added to the silanol-containing organopolysiloxane resin alone or in admixture with a small amount of an organic solvent. It is critical to reduce substantially any excess acidity in the silanol-containing organopolysiloxane, e.g., by a water wash, before adding the diatomaceous earth. For purposes of this invention, the acid level is preferably nil, but can be 5 parts per million (ppm) by weight, maximum. In any event, even with 5 ppm of acid, the amount should first be reduced, e.g., with a water wash of 10% based on resin solids.

The diatomaceous earth can be used in the bodying mixture at from 0.75 to 50% by weight of the organopolysiloxane, and preferably from 0.75 to 20%. Surprisingly, the advantageous results are not obtained with 0.5% of the diatomaceous earth. The best combination of efficiency and effectiveness is observed with 1% unactivated diatomaceous earth, based on resin solids.

It is important to use process equipment which is as free of metal, especially iron, as possible. The raw materials must also be uncontaminated with metal. Glass lined process equipment is excellent.

The mixture of acid-free silanol-containing organopolysiloxane and the diatomaceous earth must be heated to a temperature between 200°C. and 250°C., preferably between 220°C. and 230°C., to effect the desired molecular weight increase in the resin, without causing undesirable side reactions, etc. It is preferred to use either no organic solvent or, at most, 10% by weight of organic solvent if the novel bodied organopolysiloxane of this invention is to be obtained. Ultimately, however, organic solvent can be added to the bodied resin to produce varnish compositions. Suitable organic solvents include, for example, toluene, xylene, tetrahydrofuran, butyl acetate, butyl ether, trichloroethylene, and the like. Best results are obtained with the varnishes if they comprise predominantly the silanol-containing organopolysiloxane resin e.g., greater than 50% by weight, based on the solution. Preferably, as varnishes, solutions of the bodied organopolysiloxane resin in normally liquid aromatic hydrocarbon organic solvents will be employed having a concentration of 55 to 90%, and especially preferably 70% by weight of resin, based on the total weight of the solution.

Body time can vary from as little as one-half hour to 24 hours or more depending on the nature of the silanol-containing organopolysiloxane, temperature, surface area of the diatomaceous earth, the viscosity desired, and the like. A convenient method for determining the point at which the organopolysiloxane resin has reached a predetermined increase in viscosity is to use a Zahn viscosimeter. The Zahn viscosimeter, as described in General Electric Review, No. 40, 35–6 (1937) measures viscosity by duration of flow through an orifice. For example, if a No. 5 Zahn viscosimeter is used, the flow time, at reflux temperatures, of a solution of unbodied silanol-containing organopolysiloxane at 50% solids, will typically range from 3 to 5 seconds. After bodying, the flow time under the same conditions, will increase from 2 to 12-fold. This can correspond to an increase in resin viscosity of the bodied organopolysiloxane as compared to the unbodied resin, of 2 to 60-fold. At the desired viscosity, based, e.g., on a predetermined Zahn flow time, heating is terminated and the mixture is cooled, e.g., to 25°–30°C. The concentration of resin can be adjusted, e.g., by adding solvent, and any particulate material, e.g., diatomaceous earth can then be removed, e.g., by filtration.

While modifications of the Zahn techniques are valuable for following the process, especially precise control of the process is achieved if the viscosity of the unbodied resin, the bodied resin and the resin solutions is measured in a viscosimeter, such as one of the well known Bookfield-type. These give viscosity values, relatively independently of shearing effects, in centipoises at any convenient temperature, e.g., 25°C. or 30°C. It has been found that the unbodied resin has a viscosity of from about 10 to about 50, and typically 20, centipoises (cps.) at 25°C.; and that the bodied resin at 90% solids has a viscosity of about 750 to 2,000, typically 1,500 cps. at 25°C. After dilution to 70% solids, the viscosity of the bodied resin will be from about 300 to about 1,200, typically 500–1,000 cps. at 25°C.

DESCRIPTION OF THE PREFERRED EMBODIMENTS

The following examples are given by way of illustration and not limitation. All parts are by weight. Viscosities are at 25°C.

EXAMPLE 1

There is added to 900 parts of toluene, a silane blend comprising 208 parts of methyltrichlorosilane, 294 parts of phenyltrichlorosilane, 216 parts of dimethyldichlorosilane, and 282 parts of diphenyldichlorosilane. The mixture is held in a weigh tank. Water, 3,000 parts and 900 parts of acetone are placed in a hydrolyzer vessel and cooled to 20°–25°C. The silane blend is added to the mixture in the hydrolyzer controlling the feed rate for a 30-minute reaction. Cooling is used to keep the reaction temperature below 65°C. Agitation is continued for 30 minutes after silane addition is complete, then agitation is stopped and the batch is allowed to settle for 15–30 minutes. The bottom (acid) layer is separated off, also discarding the interface to make separation of the acid more complete. The solvent is stripped from the upper (organic) layer up to a temperature of 130°C. The acidity is measured. If it is greater than 5 parts per million, the acid content is reduced by washing with 10% water based on resin solids. The water is refluxed into a separator and withdrawn. Diatomaceous earth, 12.4 parts (1% by weight based on resin solids — Johns-Manville Corporation Celite 545) is added. The solvent is atmospherically stripped off to 200°–210°C. (resin solids, minimum 90% by weight) then the resin is bodied at 200°–230°C. until the viscosity reaches about 1,500 cps. at 25°C., when a sample is diluted to 70% resin solids in xylene. When this endpoint is reached, the batch is cooled to about 30°C. and cut with xylene to about 75–80% by weight of resin solids. The bodied resin-solvent composition is filtered through a bed of diatomaceous earth to remove haze and produce a clear solution, then adjusted to a final solids content of 70% by weight by adding xylene.

The clear product has an acidity of below 5 ppm, less than 10 ppm of haze and a viscosity of about 750 cps., and a specific gravity of about 9.06 lbs./gallon. It can be cured, e.g., at 200°C., without a catalyst or, if desired, a conventional catalyst can be used, e.g., 0.01% as iron, of a solution of iron octoate can be used.

EXAMPLE 2

The procedure of Example 1 is repeated, substituting as the silane blend, 485 parts of phenyltrichlorosilane, 370 parts of dimethyldichlorosilane, and 145 parts of diphenyldichlorosilane. A bodied resin and varnish composition according to this invention is obtained.

Based on the results shown above, it is apparent that the present invention provides an improved method for bodying silanol-containing organopolysiloxanes which is superior to the methods of the prior art. The bodied resin solutions can be maintained at 25°C. for many months without undergoing change. The electrical properties are superior to those of the same resins which have been bodied with acid treated clay, with acid treated diatomaceous earth, and with metallic soaps. In addition the resins bodied as described herein do not have to be filtered immediately to avoid continued bodying, as with acid activated clay. This avoids sliming on the filters and substantial economic losses in resin yields. The products cured from resins bodied according to this invention have shorter cure times and superior heat stability as compared to cured products which have been bodied with acid activated clays and with metal soaps.

It is to be understood that many variations in the process of the present invention are possible in light of the above detailed description without departing from the spirit or scope thereof. All aspects of the present invention are embraced within the full intended scope of the appended claims.

I claim:

1. A process for effecting the controlled condensation of silanol radicals in a silanol-containing organopolysiloxane, which comprises:
   1. heating at a temperature between 200°C and 250°C a mixture comprising said silanol-containing organopolysiloxane, substantially free of any acidity in excess of about 5 parts per million by weight, and unactivated diatomaceous earth in an amount of from 0.75 to 20% by weight of said silanol-containing organopolysiloxane; and
   2. recovering an organopolysiloxane from the resulting mixture of (1), having a viscosity higher than said silanol-containing organopolysiloxane which has an average ratio of from 1 to 1.8 organo radicals per silicon atom, selected from the group consisting of monovalent hydrocarbon radicals and halogenated monovalent hydrocarbon radicals.

2. A process as defined in claim 1 wherein the temperature in step (1) is between about 220°C. and about 230°C.

3. A process as defined in claim 1 including the step of reducing the amount of any organic solvent in admixture with said silanol-containing organopolysiloxane prior to step (1).

4. A process as defined in claim 1 wherein said organopolysiloxane is a methylphenylpolysiloxane.

5. A process as defined in claim 1 wherein the viscosity after step (2) corresponds to from about 500 to 1,000 cps. at 25°C. when measured on a solution of said silanol-containing organopolysiloxane at 70% by weight of resin solids in an organic solvent.

6. A process as defined in claim 5 wherein said organic solvent is xylene.

7. A process as defined in claim 1 including the step of dissolving the higher viscosity silanol-containing organopolysiloxane in an organic solvent to produce a varnish composition suitable for protecting electrical components.

8. A process which comprises:
   1. heating at a temperature between 200°C and 250°C a mixture comprising:
      i. a methylphenylpolysiloxane, substantially free of any acidity in excess of about 5 parts per million by weight, composed of chemically combined phenylsiloxy units, dimethylsiloxy units and diphenylsiloxy units, in amounts sufficient to provide for an average ratio of from about 1.25 to about 1.75 methyl and phenyl radicals per silicon atom; and
      ii. from 0.75 to 20% by weight of said methylphenylpolysiloxane of an unactivated diatomaceous earth; and
   2. recovering a methylphenylpolysiloxane from the resulting mixture of (1), having a viscosity higher than said methylphenylpolysiloxane of (1).

9. A process as defined in claim 8 wherein the amount of unactivated diatomaceous earth in the mixture of (1) is 1% by weight of said methylphenylpolysiloxane.

10. A process as defined in claim 8 wherein the temperature in step (1) is between about 220°C. and about 230°C.

11. A process which comprises:
1. heating at a temperature between 200°C and 250°C a mixture comprising:
   i. a methylphenylpolysiloxane, substantially free of any acidity in excess of about 5 parts per million by weight, composed of chemically combined methylsiloxy units, phenylsiloxy units, dimethylsiloxy units and diphenylsiloxy units, in amounts sufficient to provide for an average ratio of from about 1.25 to about 1.75 methyl and phenyl radicals per silicon atom; and
   ii. from 0.75 to 20% by weight of said methylphenylpolysiloxane of an unactivated diatomaceous earth; and
2. recovering a methylphenylpolysiloxane from the resulting mixture of (1), having a viscosity higher than said methylphenylpolysiloxane of (1).

12. A process as defined in claim 11 wherein the amount of unactivated diatomaceous earth in the mixture of (1) is 1% by weight of said methylphenylpolysiloxane.

13. A process as defined in claim 11 wherein the temperature in step (1) is between about 220°C. and about 230°C.

14. A silanol-containing organopolysiloxane, curable to a rigid, high temperature resistant resin for the protection of electronic components, produced by the process of claim 1.

15. A varnish composition for providing electrical components with a protective coating of a rigid, high temperature resistant resin, said composition comprising a curable silanol-containing organopolysiloxane produced by the process of claim 1 and, as a solvent-carrier therefor, a normally liquid aromatic hydrocarbon.

16. A varnish composition as defined in claim 15 having a viscosity of from about 500 to about 1,000 cps. at 25°C. at a resin solids content of about 70% by weight.

* * * * *